United States Patent Office 2,951,013
Patented Aug. 30, 1960

2,951,013

ANTISPASMODIC COMPOUNDS AND COMPOSITIONS COMPRISING BASICALLY SUBSTITUTED DERIVATIVES OF 1-BENZYL TETRAHYDROISOQUINOLINE

Ferdinand Dengel, Mannheim, Germany, assignor to Knoll A.G. Chemische Fabriken, Ludwigshafen (Rhine), Germany, a corporation of Germany No Drawing. Filed Jan. 26, 1955, Ser. No. 484,297

Claims priority, application Germany Jan. 30, 1954

14 Claims. (Cl. 167—65)

The present invention relates to new 1-benzyl tetrahydroisoquinoline compounds and more particularly to new basically substituted derivatives of 1-benzyl tetrahydroisoquinoline which are substituted in their aromatic nuclei by methoxy or ethoxy groups, and to a process of making same.

It is one object of the present invention to provide new and valuable basically substituted derivatives of 1-benzyl tetrahydroisoquinoline which are substituted in their aromatic nuclei by methoxy or ethoxy groups.

Another object of the present invention is to provide new highly effective spasmolytic agents of considerably prolonged spasmolytic and, at the same time, marked blood pressure decreasing activity.

A further object of the present invention is to provide acid adition salts of such basically substituted derivatives of 1-benzyl tetrahydroisoquinoline which are readily soluble in water and, therefore, especially adapted for parenteral administration.

Still another object of the present invention is to provide simple and advantageous processes of producing such basically substituted derivatives of 1-benzyl tetrahydroisoquinoline which are substituted in their aromatic nuclei by methoxy or ethoxy groups.

Another object of the present invention is to provide valuable therapeutic preparations containing such basically substituted derivatives of 1-benzyl tetrahydroisoquinoline and, especially, valuable therapeutic preparations containing such derivatives in combination with novel theophylline derivatives, said combinations being substantially free of the disadvantageous side-effects of such theophylline compounds.

Other objects of the present invention and advantageous features thereof will become apparent as the description proceeds.

In principle, the new compounds according to the present invention correspond to the following Formula I

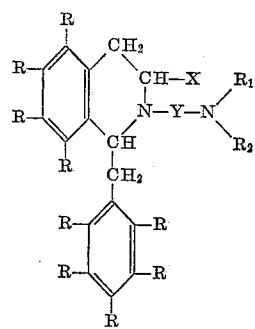

In said formula—
X indicates hydrogen or a lower alkyl radical,
R indicates hydrogen, the methoxy, or the ethoxy group,
$R_1$ and $R_2$ are hydrogen, a lower alkyl radical, an aralkyl radical with 7 to 8 carbon atoms, an aralkyl radical with 7 to 8 carbon atoms and having lower alkoxy groups attached to the aryl ring, and $R_1$ and $R_2$ forming together with the nitrogen atom to which they are attached, a monocyclic heterocyclic ring, and
Y is a straight-chain or branched alkylene radical with 2 to 4 carbon atoms.

Said new compounds can be produced by various processes. They are obtained, for instance, by reacting compounds of Formula II

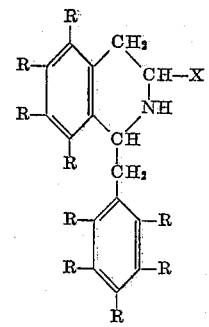

wherein X indicates hydrogen or a lower alkyl radical and R indicates hydrogen, the methoxy, or the ethoxy group, with halogenides of Formula III

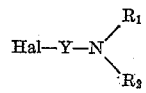

wherein Hal indicates halogen and $R_1$, $R_2$, and Y have the same meaning as indicated above in Formula I. This reaction is preferably carried out in the presence of acid binding agents, such as potassium carbonate, alkali alcoholate, sodium amide, tertiary amines.

Another process of producing the above illustrated compounds of Formula I comprises first condensing a compound of Formula II with an alkylene oxide, then halogenating the resulting alcohol, and finally replacing the halogen in the halogenide obtained thereby by an amino group by reaction with ammonia or amines.

Still another process of producing the above illustrated compounds of Formula I comprises first condensing a compound of Formula II with a halogeno alcohol, then replacing the alcoholic hydroxyl group by halogen, and finally reacting the resulting halogenide with ammonia or an amine.

Another process of producing said compounds of Formula I comprises first adding to compounds of Formula IV or V

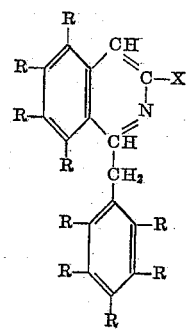

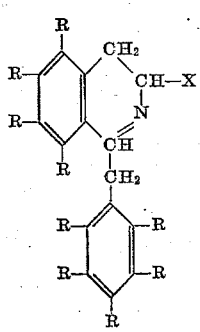

halogeno alcohols, thereafter hydrogenating the resulting quaternary ammonium compounds to the corresponding N-hydroxy alkyl tetrahydroisoquinoline compounds, then replacing the alcoholic hydroxyl group by halogen, and finally substituting said halogen atom by a free or substituted amino group. According to another modification of this process the alcohol group in the resulting quaternary ammonium compound is first replaced by halogen, then reacted with ammonia or an amine, and the diamino compound obtained thereby is finally hydrogenated in the pyridine ring.

As stated above, the new compounds, and especially the 1-(3',4'-diethoxy benzyl)-2-(N-methyl-N-3'',4''-dimethoxy phenyl ethyl-β-amino ethyl)-6,7-diethoxy-1,2,3,

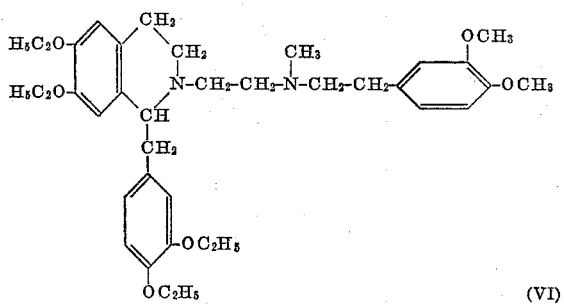

4-tetrahydroisoquinoline compound of Formula VI are excellent spasmolytic agents which relax the smooth muscles of blood vessels and particularly the coronary arteries, as well as other smooth muscles. The compounds are in their activity similar to spasmolytic agents of the papaverine type but differ therefrom in several respects. In contrast to papaverine they produce a spasmolytic effect of long duration in spastic conditions of the smooth muscles of blood vessels while, at the same time, the blood pressure is decreased.

Another important difference of the new compounds over papaverine is the ability of aqueous salt solutions of the new bases to remain clear when mixed with blood serum while, on mixing papaverine salt solutions with blood serum, precipitation of the papaverine base with serum protein takes place.

Acid addition salts of the new bases with inorganic acids, especially the hydrochlorides of said bases, have the further advantage that they are readily soluble in water while the hydrochlorides of bases of the papaverine type are difficultly soluble in water. The better solubility of salts of the new compounds in water is a very advantageous and distinctive feature thereof.

The following examples serve to illustrate the present invention without, however, limiting the same thereto.

EXAMPLE 1.—1-(3',4'-DIMETHOXY BENZYL)-2-DIETHYLAMINO - β - ETHYL - 6,7 - DIMETHOXY - 1,2,3,4 - TETRAHYDROISOQUINOLINE 54 g. of β-diethylamino chloro ethane and 55 g. of freshly calcined potassium carbonate are added to a solution of 90.4 g. of Py-tetrahydropapaverine base in 300 cc. of acetone. The mixture is heated under reflux to boiling on the water bath for 8 hours. Potassium chloride is filtered off by suction while the solution is still warm. The acetone is evaporated from the filtrate. The resulting residue is heated in a vacuum to 100° C. for some time. The remaining light-yellow oily base is dissolved in 300 cc. of ethanol. The solution is acidified with concentrated hydrochloric acid and is allowed to stand in the refrigerator. Thereby, the solution solidifies to a paste of soft, loosely packed white crystals of the hydrochloride of the above mentioned compound. 83.5 g. of crude hydrochloride, corresponding to 62.5% of the theoretical yield, are obtained thereby.

In order to purify said salt it is dissolved in 1,200 cc. of boiling ethanol. 2,000 cc. of acetone are added to said solution. Thereby 73 g. of white, loosely packed crystals of the hydrochloride, melting at 200° C., with decomposition, are obtained.

EXAMPLE 2.—1-(3',4'-DIMETHOXY BENZYL)-2-DIETHYLAMINO - β - ETHYL - 6,7 - DIMETHOXY- 1,2,3,4-TETRAHYDROISOQUINOLINE

I. *1 - (3',4' - dimethoxy benzyl) - 2 - β - hydroxyethyl-6,7 - dimethoxy - 1,2,3,4 - tetrahydroisoquinoline - N-β-hydroxy ethyl-1,2,3,4-tetrahydropapaverine*

(a) The ice cold mixture of 80 g. of ethylene oxide and 150 cc. of water is added to a solution of 110.7 g. of Py-tetrahydropapaverine base in 200 cc. of ethanol. The mixture is heated in an autoclave to 110° C. for 6 hours while stirring. The resulting solution is evaporated to dryness, the residue is dissolved in acetone, gaseous hydrochloric acid is passed into the solution until acidified. The acid solution is allowed to cool in a refrigerator whereby it solidifies by precipitation of the crystalline hydrochloride of 1-(3',4'-dimethoxy benzyl)-2-β-hydroxy ethyl - 6,7 - dimethoxy - 1,2,3,4 - tetrahydroisoquinoline. 89 g. corresponding to 65% of the theoretical yield, are obtained thereby. The hydrochloride, on recrystallization from ethanol and acetone, melts at 176° C.

(b) A solution of 110.7 g. Py-tetrahydropapaverine base and 36.4 g. of β-chloro ethanol in 250 cc. of toluene is heated to boiling under reflux for 7 hours. Thereby 58 g. of tetrahydro papaverine hydrochloride precipitate in the form of white crystals melting at 218° C. The crystals are filtered off by suction, the filtrate is evaporated in a vacuum to dryness, the remaining oily base is dissolved in dilute sulfuric acid, and impurities are removed from said solution by extraction with ether. On addition of sodium hydroxide solution, 1-(3',4'-dimethoxy benzyl)-2-β-hydroxy ethyl-6,7-dimethoxy-1,2,3,4-tetrahydroisoquinoline precipitates in the form of an oil and solidifies on rubbing to an ivory colored crystalline powder melting at 67–68° C. The yield of said crude base amounts to 62.4 g. corresponding to 100% of the theoretical yield.

(c) 73 g. of β-chloro ethanol and 50 g. of freshly calcined potassium carbonate are added to a solution of 110 g. of Py-tetrahydropapaverine base in 500 cc. of acetone. The mixture is boiled under reflux for 24 hours. The inorganic salts are filtered off by suction while the reaction mixture is still warm. Gaseous hydrochloric acid is introduced into the filtrate until acidified. The solution is then cooled and solidifies to a paste of white crystals. The crystals are filtered off by suction and dried. In this manner 125 g. of 1-(3',4'-dimethoxy benzyl)-2-β-hydroxy ethyl-6,7-dimethoxy-1,2,3,4-tetrahydroisoquinoline hydrochloride, melting at 172–174° C., are obtained. The yield amounts to 94% of the theoretical yield.

(d-1) *N-β-hydroxy ethyl papaverinium bromide.*—100 g. of papaverine are dissolved in a boiling mixture of 300 cc. of ethanol and 10 cc. of water. 41 g. of β-bromo ethanol are added thereto and the mixture is boiled under reflux for 24 hours. Thereafter, the reaction solution is evaporated to dryness in a vacuum. The resulting crystalline residue is dissolved in 1,000 cc. of warm water. The solution is extracted with ether. The extracted aqueous solution is then evaporated to dryness and the evaporation residue is recrystallized from ethanol. 111 g. of N-β-hydroxy ethyl papaverinium bromide corresponding to a yield of 81% of the theoretical yield are obtained thereby in the form of an ivory colored crystalline powder melting at 189–204° C.

(d–2) *N-β-hydroxy ethyl-1,2,3,4-tetrahydropapaverine.*—A solution of 110 g. of the above described N-β-hydroxy ethyl papaverinium bromide in 500 cc. of methanol is hydrogenated by means of Raney nickel catalyst at 120° C. and with hydrogen under a pressure of 100 atmospheres gauge. The calculated amount of hydrogen is absorbed within 30 minutes. The catalyst is filtered off by suction, the alcohol is evaporated in a vacuum, the remaining salt is dissolved in water, and impurities are removed by extraction with benzene. The base precipitates on addition of concentrated potassium carbonate solution. It is dissolved in warm benzene and is filtered to yield a clear filtrate. Benzene is evaporated from the filtrate and the evaporation residue is dissolved in 500 cc. of acetone. Gaseous hydrochloric acid is introduced into said solution until acidified. On standing, 91 g. of N-β-hydroxy ethyl-1,2,3,4-tetrahydropapaverine hydrochloride precipitate in the form of white crystals melting at 173° C. Yield: 91% of the theoretical yield.

(e–1) *N-β-hydroxy ethyl-3,4-dihydropapaverinium bromide.*—250 g. of 3,4-dimethoxy phenyl acetyl-N-3′,4′-dimethoxy phenyl-β-ethylamine, dissolved in benzene, are condensed with phosphorus oxychloride to 3,4-dihydropapaverine. The resulting dihydro-base is dissolved in 100 cc. of boiling ethanol, 65 g. of β-bromo ethanol are added thereto, and the mixture is boiled under reflux in a nitrogen atmosphere for 12 hours. The red solution is then poured into ether while stirring. Thereby, the quaternary ammonium salt precipitates in the form of a tenacious mass which, on further trituration with ether, disintegrates to a yellow, hygroscopic crystalline powder. Yield: 231 g. of N-β-hydroxy ethyl-3,4-dihydropapaverinium bromide, corresponding to 71% of the theoretical yield. The melting point of said quaternary salt is unsharp. The salt is readily soluble in water, methanol, ethanol, acetone, chloroform, and is insoluble in ether.

(e–2) *N-β-hydroxy ethyl-1,2,3,4-tetrahydropapaverine.*—A solution of the above described quaternary ammonium bromide is dissolved in 1,000 cc. of ethanol and hydrogenated with Raney-nickel catalyst at 100° C. and with hydrogen under a pressure of 100 atmospheres gauge. The calculated amount of hydrogen is absorbed within 15 minutes. The catalyst is filtered off and the filtrate is evaporated to dryness in a vacuum. The resulting hydrobromide is dissolved in warm water, extracted with benzene, and the oily base is precipitated from the aqueous solution by the addition of potassium carbonate. The precipitated oil is dissolved in warm benzene, the solvent is evaporated in a vacuum, the crude base is dissolved in 1,200 cc. of acetone, and gaseous hydrochloric acid is introduced into the solution until acidified. The resulting acid solution, on standing, yields 185 g. of N-β-hydroxy ethyl-1,2,3,4-tetrahydropapaverine hydrochloride which precipitates in the form of a white crystalline powder melting at 173° C. The yield is 63% of the theoretical yield, calculated for the acid amide 3,4-dimethoxy phenyl acetyl-N-3′,4′-dimethoxy phenyl-β-ethylamine used as starting material.

II. *1-(3′,4′-dimethoxy benzyl) - 2 - (β-diethylamino-β-ethyl)-6,7-dimethoxy-1,2,3,4-tetrahydroisoquinoline*

A mixture of 31 g. of thionylchloride and 100 cc. of chloroform is added, drop by drop, to a solution of 100 g. of N-β-hydroxy ethyl-1,2,3,4-tetrahydropapaverine hydrochloride in 400 cc. of chloroform at 0° C. while stirring. The reaction mixture is allowed to stand in a refrigerator over night and the solvent is evaporated at a low temperature. The remaining hydrochloride of N-β-chloroethyl tetrahydropapaverine is a non-crystallizing oil which solidifies to a glassy product.

26 g. of diethylamine and 70 g. of freshly calcined potassium carbonate are added to a solution of the resulting crude hydrochloride in 350 cc. of acetone and the mixture is boiled under reflux for 24 hours. The inorganic salts are filtered off by suction while the solution is still warm. The acetone is evaporated from the filtrate and the oily residue is heated at 70° C./6 Torr. for one hour in order to remove diethylamine present therein. The heated residue is dissolved in 350 cc. of ethanol and the solution is acidified by the addition of concentrated hydrochloric acid. The mixture solidifies to a voluminous cake of crystals which tenaciously enclose mother liquor. The cake is subjected to centrifuging. The salt obtained thereby is dissolved in 1,100 cc. of boiling alcohol and 1,500 cc. of acetone are added to the hot solution. On cooling, the hydrochloride precipitates in the form of white crystals. The salt sinters at 198° C. and melts at 200° C. with decomposition. It is readily soluble in water, soluble in warm methanol, and ethanol, difficultly soluble in acetone, and insoluble in ether. The yield amounts to 90 g. of the di-hydrochloride corresponding to 74% of the theoretical yield.

EXAMPLE 3.—1-(3′,4′-DIETHOXY BENZYL)-2-DIETHYLAMINO-β-ETHYL - 6,7-DIETHOXY-1,2,3,4-TETRAHYDROISOQUINOLINE 17.8 g. of freshly distilled diethylamino-β-chloro ethane and 18.2 g. of dry potassium carbonate are added to a solution of 39 g. of 1-(3′,4′-diethoxy benzyl)-6,7-diethoxy-1,2,3,4-tetrahydroisoquinoline in 150 cc. of acetone. The reaction mixture is boiled under reflux for 24 hours. Potassium chloride is filtered off by suction from the reaction solution, the filtrate is evaporated to dryness in a vacuum, and the oily residue is heated in a boiling water bath at 6 Torr. for 30 minutes. The oily crude base is then dissolved in dilute hydrochloric acid, extracted with ether, the extracted solution is rendered alkaline, and the precipitated base is extracted with ether. The ethereal extract is dried over potassium hydroxide, the ether is evaporated therefrom, and the residue is dissolved in 400 cc. of acetone. On introducing gaseous hydrochloric acid into said solution, the di-hydrochloride precipitates first in the form of a gelatinous mass which, on addition of 200 cc. of ether and rubbing, is converted into fine crystals. 30 g. of 1-(3′,4′-diethoxy benzyl)-2-diethylamino-β-ethyl-6,7-diethoxy - 1,2,3,4-tetrahydroisoquinoline di-hydrochloride, corresponding to 54% of the theoretical yield, are obtained thereby. Said compound, after recrystallization from a mixture of methanol and acetone, decomposes at 210° C. The salt is readily soluble in water, methanol, and ethanol, and only slightly soluble in acetone.

EXAMPLE 4.—1-(3′-METHOXY-4′-ETHOXY BENZYL)-2-DIETHYLAMINO-β-ETHYL-6-METHOXY-7-ETHOXY-1,2,3,4-TETRAHYDROISOQUINOLINE 17 g. of the hydrochloride of 1-(3′-methoxy-4′-ethoxy benzyl) - 6 - methoxy - 7 - ethoxy - 1,2,3,4 - tetrahydroisoquinoline are converted into the free base. Said base is dissolved in 100 cc. of acetone and the solution is boiled under reflux with 8.5 g. of freshly distilled diethylamino-β-chloro ethane and 8.6 g. of dry potassium carbonate for 24 hours. The reaction mixture is worked up as described in Example 3. The resulting crude base is dissolved in ethanol and the solution is acidified by the addition of ethanolic hydrochloric acid. Thereby the mixture solidifies in crystalline form with precipitation of the corresponding di-hydrochloride. On recrystallization from ethanol, 16.2 g. of white crystals which sinter at 209° C. and melt at 211–213° C. are obtained. The yield amounts to 71% of the theoretical yield. The salt is readily soluble in water and chloroform, soluble in methanol and ethanol, slightly soluble in acetone, and insoluble in ether.

EXAMPLE 5.—1-(3',4'-DIETHOXY BENZYL)-2-(DI-N - BUTYLAMINO - β - ETHYL)-6,7-DIETHOXY-1,2,3,4-TETRAHYDROISOQUINOLINE 100 g. of the hydrochloride of 1-(3',4'-diethoxy benzyl)-6,7-diethoxy-1,2,3,4-tetrahydroisoquinoline are converted into the free base. Said free base is dissolved in 400 cc. of acetone. The resulting solution is boiled under reflux with 48 g. of di-n-butylamino-β-chloro ethane and 48 g. of dry potassium carbonate for 24 hours. The reaction mixture is worked up as described in Example 3. The resulting crude base is dissolved in 2,000 cc. of ether and the resulting ethereal solution is acidified by the addition of ethanolic hydrochloric acid while stirring. Thereby, the desired di-hydrochloride precipitates in the form of a loosely packed, voluminous, white, crystalline powder which melts, on recrystallization from 20% by volume aqueous ethanol, at 132–134° C. The yield is 98 g. corresponding to 68% of the theoretical yield. On concentrating the mother liquor by evaporation, 5 g. of the salt are additionally obtained. The compound is readily soluble in water, ethanol, methanol, acetone, and chloroform.

EXAMPLE 6.—1 - (3',4'-DIETHOXY BENZYL)-2-N-PIPERIDYL-β-ETHYL-6,7-DIETHOXY-1,2,3,4-TETRAHYDROISOQUINOLINE 56 g. of freshly distilled β-N-chloro ethyl piperidine and 63 g. of dry potassium carbonate are added to a solution of 152 g. of 1-(3',4'-diethoxy benzyl)-6,7-diethoxy-1,2,3,4-tetrahydroisoquinoline in 500 cc. of acetone. The mixture is boiled under reflux for 24 hours, and is worked up as described in Example 3. The resulting light yellow, rapidly crystallizing crude base, melting at 71° C., is obtained in a theoretical yield. It is readily soluble in methanol, ethanol, acetone, ether, benzene, and ethyl acetate, and slightly soluble in water. The anhydrous hydrochloride is obtained by introducing gaseous hydrochloric acid into the solution of the base in absolute ether. The salt represents a strongly hygroscopic, white, crystalline powder which, on standing with access of air, deliquesces to a sirup within a few minutes. Said sirup solidifies after some time to a white crystalline cake of the hydrate of said di-hydrochloride, said hydrate containing 5 mols of water of crystallization.

On dissolving the crude base in 400 cc. of 2 N hydrochloric acid a clear solution is obtained which solidifies, on standing, to a soft, white, crystalline cake of said hydrate of the di-hydrochloride of the base. The hydrate is filtered off by suction, washed with 2 N hydrochloric acid, and dried over potassium hydroxide. 190 g. of 1-(3',4' - diethoxy benzyl)-2-N-piperidyl-β-ethyl-6,7-diethoxy-1,2,3,4-tetrahydroisoquinoline di-hydrochloride pentahydrate, melting at 81° C., are obtained thereby. The yield amounts to 74% of the theoretical yield. The compound is readily soluble in water, methanol, ethanol, and acetone.

EXAMPLE 7.—1-(3',4',5'-TRIMETHOXY BENZYL)-2 - DIETHYLAMINO - β - ETHYL-6,7,8-TRIMETHOXY-1,2,3,4-TETRAHYDROISOQUINOLINE 100 g. of the hydrochloride of 1-(3',4',5'-trimethoxy benzyl) - 6,7,8 - trimethoxy-1,2,3,4-tetrahydroisoquinoline are converted into the free base. Said free base is dissolved in 250 cc. of acetone. 47 g. of diethylamino-β-chloro ethane and 48 g. of dry potassium carbonate are added to said solution and the mixture is boiled under reflux for 24 hours. The resulting reaction mixture is worked up as described in Example 3. The crude base is dissolved in n-hexane and gaseous hydrochloric acid is introduced into the solution until acidified. The di-hydrochloride formed thereby precipitates first in amorphous form and, on rubbing, is converted into a crystalline powder. In this manner 96 g. of the di-hydrochloride are obtained in the form of a white crystalline powder which, on recrystallization from acetone-methanol, melts at 140.5–142° C. The yield amounts to 73% of the theoretical yield.

EXAMPLE 8.—1-(3',4',5'-TRIETHOXY BENZYL)-2-DIETHYLAMINO-β-ETHYL - 6,7,8—TRIETHOXY-1,2,3,4-TETRAHYDROISOQUINOLINE 40.7 g. of diethylamino-β-chloro ethane and 42 g. of dry potassium carbonate are added to a solution of 97.4 g. of 1-(3',4',5'-triethoxy benzyl) - 6,7,8 - triethoxy-1,2,3,4-tetrahydroisoquinoline in 250 cc. of acetone and the mixture is boiled under reflux for 24 hours. The resulting reaction mixture is worked up as described in Example 3. The precipitated crude base is dissolved in acetone and gaseous hydrochloric acid is introduced into the solution until acidified. Thereby, the di-hydrochloride precipitates in an amount of 102 g. corresponding to 82% of the theoretical yield. The white, loosely packed, crystalline powder melts, on recrystallization from acetone-methanol, at 180.5–183° C. The salt is soluble in water of 20° C. in an amount of 8.7% by weight. When exposed to air, the dry salt absorbs 1 mol of water of crystallization. It is readily soluble in methanol, ethanol, and chloroform, and very slightly soluble in acetone.

EXAMPLE 9.—1 - (2', 3', 4'-TRIETHOXY BENZYL)-2-DIETHYLAMINO-β-ETHYL - 5,6,7-TRIETHOXY-1,2,3,4-TETRAHYDROISOQUINOLINE 100 g. of the hydrochloride of 1-(2',3',4'-triethoxy benzyl) - 5,6,7-triethoxy - 1,2,3,4-tetrahydroisoquinoline are converted into the base. Said base is dissolved in 250 cc. of acetone and 39 g. of freshly distilled diethylamino-β-chloro ethane and 40 g. of dry potassium carbonate are added thereto. The mixture is boiled under reflux for 24 hours. The resulting reaction mixture is worked up as described in Example 3. The crude base obtained thereby is dissolved in benzene and gaseous hydrochloric acid is introduced into said solution until acidified. On mixing the clear solution with twice its colume of ether, the di-hydrochloride precipitates in the form of a crystalline powder of brownish color and in an amount of 106 g. corresponding to 81% of the theoretical yield. On recrystallization from methanol-benzene and further purification of the salt by reconversion into the base and reprecipitation in the form of the hydrochloride from the benzene solution of said base by means of gaseous hydrochloric acid and ether, the pure salt is obtained. It melts at 180–182° C. and is hygroscopic.

EXAMPLE 10.—1-(3',4',5'-TRIETHOXY BENZYL)-2-DIETHYLAMINO - β - ETHYL-3-METHYL-6,7,8-TRIETHOXY - 1,2,3,4 - TETRAHYDROISOQUINOLINE 100 g. of the hydrochloride of 1-(3',4',5'-triethoxy benzyl)-3-methyl-6,7,8-triethoxy-1,2,3,4 - tetrahydroisoquinoline are converted into the base. Said base is dissolved in 250 cc. of actone and the resulting solution is boiled under reflux with 39 g. of diethylamino-β-chloro ethane and 40 g. of dry potassium carbonate for 24 hours. The resulting reaction mixture is worked up as described in Example 3. In contrast to the compounds mentioned in the preceding examples, it is not possible to produce the di-hydrochloride in crystalline form. Therefore, the crude base is purified by molecular (short path) distillation at vacuum of 0.01 Torr. The base distills in the form of a light-yellow oil at an air bath temperature of 210° C. Yield: 81 g. corresponding to 72% of the theoretical yield.

The di-picrate of said base is obtained from its ethanolic solution. It melts at 147.5–149.5° C. on recrystallization from ethanol.

EXAMPLE 11.—1-(3',4',5'-TRIETHOXY BENZYL)-2-(DI-N-BUTYLAMINO - β - ETHYL)-6,7,8-TRIETHOXY - 1,2,3,4 - TETRAHYDROISOQUINOLINE 30.5 g. of freshly distilled di-n-butylaminochloro ethane and 26 g. of dry potassium carbonate are added to a solution of 76 g. of 1-(3',4',5'-triethoxy benzyl)-6,7,8-triethoxy - 1,2,3,4 - tetrahydroisoquinoline in 200 cc. of acetone. The mixture is boiled under reflux for 24 hours. The resulting reaction mixture is worked up as described in Example 3. Thereby a solution of the crude base in 1,000 cc. of ether is obtained. Said ethereal solution is dried over potassium hydroxide. Gaseous hydrochloric acid is introduced into the solution until acidified. On allowing the clear solution to stand, the di-hydrochloride precipitates as a loosely packed, crystalline powder. Yield: 73 g. corresponding to 66% of the theoretical yield. Melting point: 132–134° C. The salt is readily soluble in water, methanol, ethanol, actone, and chloroform.

EXAMPLE 12.—1-(3',4',5'-TRIMETHOXY BENZYL)-2 - (DI-N-BUTYLAMINO - β - ETHYL)-6,7,8-TRIMETHOXY - 1,2,3,4 - TETRAHYDROISOQUINOLINE 250 cc. of acetone are poured over 83 g. of the hydrochloride of 1-(3',4',5'-trimethoxy benzyl)-6,7,8-trimethoxy-1,2,3,4-tetrahydroisoquinoline. 62 g. of potassium carbonate are added thereto and the mixture is heated to boiling for 30 minutes. Thereafter 36.3 g. of freshly distilled di-n-butylamino-β-chloro ethane are added and the mixture is boiled under reflux for 24 hours. The resulting reaction mixture is worked up as described in Example 3. Thereby 112 g. of the crude base are obtained in the form of a yellowish-red oil which is dissolved in 300 cc. of acetone and is acidified by introducing gaseous hydrochloric acid. On allowing the mixture to stand in the refrigerator, the solution solidifies to a paste of white crystals which are filtered off by suction and are washed with acetone. 27 g. of the di-hydrochloride, melting at 136–138° C., are obtained. By concentrating the mother liquor by evaporation an additional 41 g. of said di-hydrochloride are recovered. The total yield amounts to 68 g. corresponding to 57% of the theoretical yield. The salt is readily soluble in water, methanol, ethanol, and chloroform, soluble in acetone, and insoluble in ether.

EXAMPLE 13.—1 - (3',4'-DIETHOXY BENZYL) - 2-(N-BENZYL - N - METHLYAMINO-β-ETHYL)-6,7 - DIETHOXY - 1,2,3,4-TETRAHYDROISOQUINOLINE 70 g. of N - methyl-N-benzylamino-β-chloro ethane which was freshly distilled in a high vacuum (boiling point: 80° C./0.1 Torr.) and 63 g. of dry potassium carbonate are added to a solution of 153 g. of 1-(3',4'-diethoxy benzyl)-6,7-diethoxy-1,2,3,4 - tetrahydroisoquinoline in 450 cc. of warm methanol. The mixture is heated to boiling under reflux on the water bath for 24 hours. The resulting reaction mixture is worked up as described in Example 3. Thereby 200 g. of the crude base are obtained. Said base is suspended in 200 cc. of acetone and 21 g. of undissolved halogen containing crystalline powder are removed therefrom by filtration. The acetone solution is acidified by introducing gaseous hydrochloric acid thereinto and is allowed to cool in a refrigerator. After a few days the solution solidifies with precipitation of the di-hydrochloride of the base in the form of a white, crystalline powder melting at 180–183.5° C. Yield: 120 g. of the di-hydrochloride. The salt, on exposure to air, absorbs 6.9% of water of crystallization. It is very readily soluble in water, readily soluble in methanol, ethanol, and chloroform, and less readily soluble in acetone.

EXAMPLE 14.—1-(3',4'-DIETHOXY BENZYL)-2-(N-METHYL - N - 3'',4'' - DIMETHOXY PHENYL ETHYL-β-AMINO ETHYL)-6,7-DIETHOXY-1,2,3,4-TETRAHYDROISOQUINOLINE 67.8 g. of the hydrochloride of N-(3,4-dimethoxy phenyl-β-ethyl)-N-methylamino-β-chloro ethane are dissolved in water. A potassium carbonate solution is added thereto. The resulting base is extracted with benzene. The benzene is removed from the benzene extract by distillation in a vacuum at 40° C. The resulting oily base is dissolved in 500 cc. of acetone. 92.6 g. of 1-(3',4'-diethoxy benzyl)-6,7-diethoxy-1,2,3,4-tetrahydroisoquinoline and 46 g. of dry potassium carbonate are added to said solution and the mixture is boiled under reflux on the water bath for 24 hours. The resulting reaction mixture is worked up as described in Example 3. The crude base is dissolved in a mixture of 150 cc. of ethanol and 150 cc. of ether and gaseous hydrochloric acid is introduced into said solution until acidified. On allowing the mixture to stand in a refrigerator it solidifies with precipitation of the di-hydrochloride in the form of a very fine white powder melting at 222–223.5° C. The yield is 102 g. corresponding to 64% of the theoretical yield. The salt is slightly soluble in water, and soluble in methanol, ethanol, acetone, and chloroform.

The initial base N-(3,4-dimethoxy phenyl-β-ethyl)-N-methylamino-β-chlor ethane of this example is prepared by reacting homoveratrylamine with the calculated amount of ethylene oxide or β-chloro ethyl alcohol and methylating the base so obtained by formaldehyde and formic acid and then replacing the alcoholic OH-group by chlorine by means of thionylchloride.

According to another process the said base is prepared by reacting N-methyl homoveratrylamine with ethylene oxide or with β-chloro ethyl alcohol and then replacing the OH group of the base so obtained by chlorine by means of thionylchloride.

In place of the halogeno alkyl amine compounds of Formula III as used in the preceding examples, there can, of course, be employed equimolecular amounts of other halogeno alkyl amine compounds while otherwise the procedure is the same as in said examples. The following halogeno alkyl amine compounds of Formula III which are useful in this reaction are mentioned without, however, limiting the present invention thereto:

Amino ethyl chloride,
Diethanol amino ethyl chloride,
n-Propylamino ethyl chloride,
n-Isopropyl amino ethyl chloride,
n-Butylamino ethyl chloride,
Morpholino ethyl chloride,
Benzylamino ethyl chloride,
N-β-hydroxy ethyl-N-methylamino ethyl chloride,
Diallylamino ethyl chloride,
Cyclohexylamino ethyl chloride,
N-cyclopentyl-N-methylamino ethyl chloride,
N-isobutyl-N-methylamino ethyl chloride,
N-[6-methyl heptene-(5)-yl-(2)]-N-methylamino ethyl chloride,
Anilino-N-ethyl chloride,
N-phenyl-N-ethylamino ethyl chloride,
N-phenyl-N-butylamino ethyl chloride,
N-phenyl-N-cyclohexyl-amino ethyl chloride,
N-benzyl-N-cyclohexylamino ethyl chloride,
N-phenyl-N-benzylamino ethyl chloride,
(Pyridyl-2)-amino ethyl chloride,
Pyrrolidino ethyl chloride and others.

It is, of course, also possible and, in some instances, especially if the halogene alkyl amine compounds are not readily available, even the preferred procedure to first produce N-halogeno alkyl substituted 1-benzyl tetrahydroisoquinoline compounds in an analogous manner as described in Example 2, and then to substitute the halogen atom by an amino group by reaction with equimolecular amounts of ammonia or amines as this procedure is also set forth in detail in Example 2 under II. Amines useful for this purpose are, for instance, the following without, however, limiting the present invention thereto:

Monoethanol amine,
Diethanol amine,
n-Butylamine,
Di-isobutylamine,
Benzylamine,
N-$\beta$-hydroxy ethyl-N-methylamine,
Diallylamine,
Cyclohexylamine,
N-cyclopentyl-N-methylamine,
N-isobutyl-N-methylamine,
Piperidine,
Morpholine,
Piperazine,
N-benzyl-N-methylamine,
N-3,4-dimethyloxy phenyl ethyl-N-methylamine,
Aniline,
N-[6-methylheptene-(9)-yl-(2)]-N-methylamine,
N-ethyl aniline,
N-benzyl-N-cyclohexylamine,
N-benzylaniline,
2-amino pyridine, and others.

In place of the ethylene radical (see Formula I) $y$ may signify propylene, isopropylene, butylene.

In place of the methoxy and ethoxy substituted 1-benzyl tetrahydroquinoline compounds used as starting materials in the preceding examples, there can be employed equimolecular amounts of other compounds of said type while otherwise the procedure is the same as set forth in said examples. Such compounds useful for the purpose of the present invention are, for instance, the following compounds:

1 - (3',4' - diethoxy benzyl)-3-ethyl-6,7-diethoxy-1,2,3,4-tetrahydroisoquinoline,
1-(3',4'-dimethoxy benzyl)-3-propyl-6,7-dimethoxy-1,2,3,4-tetrahydroisoquinoline,
1-(3',4'-diethoxy benzyl)-3-isopropyl-6,7-diethoxy-1,2,3,4-tetrahydroisoquinoline,
1-(3',4',5'-trimethoxy benzyl)-3-n-butyl-6,7,8-trimethoxy-1,2,3,4-tetrahydroisoquinoline,
1-(2'-methoxy benzyl)-5-methoxy-1,2,3,4-tetrahydroisoquinoline, and others.

These and other starting materials of the 1-benzyl tetrahydroisoquinoline series are obtained, for instance, by hydrogenating the corresponding isoquinoline and dihydroisoquinoline compounds with hydrogen and Raney-nickel catalyst in a similar manner as set forth in Example 2 under II. Said isoquinoline and dihydroisoquinoline compounds are obtainable, for instance, according to the process set forth in copending application Serial No. 451,932 of Ferdinand Dengel and Walter Krastinat entitled "1-Benzyl Isoquinoline Compounds and a Process of Making Same," which application was filed on August 24, 1954, now abandoned, as a continuation-in-part to application Serial No. 217,069, filed March 22, 1951, now abandoned.

As stated hereinbefore and set forth in the examples, the new compounds are capable of forming acid addition salts with inorganic acids, such as hydrochloric acid, hydrobromic acid, sulfuric acid, phosphoric acid, nitric acid, and others, as well as with organic acids, such as acetic acid, propionic acid, tartaric acid, lactic acid, citric acid, malonic acid, oxalic acid, maleic acid, succinic acid, benzoic acid, phthalic acid, cinnamic acid, and others. The hydrochloride, however, has proved to be especially suitable for practical purposes.

The new compounds, and especially the 1-(3',4'-diethoxy benzyl)-2-(N-methyl-N-3'',4''-dimethoxy phenyl ethyl - $\beta$ - amino ethyl) - 6,7 - diethoxy - 1,2,3,4 - tetrahydroisoquinoline of Example 14, possess a high vasolytic activity and have a very favorable effect upon the circulatory system. They produce a surprisingly high vasodilating effect resulting in a decrcease in the total peripheral resistance and, at the same time, in a decrease in the elastic resistance of the blood vessels and, due thereto, they effect lowering of the blood pressure. Said vasodilating action lasts for 30 minutes to 60 minutes when intravenously injecting 0.5 mg. to 1.0 mg. of the new compound per kg. into experimental animals (dog). Thereby output and minute volume of the heart remain unaffected and only a slight decrease in frequency of the heart beat is observed.

The new compounds, and especially the above mentioned compound of Example 14, possess a low toxicity and, therefore, a satisfactory therapeutic index. The $LD_{50}$ of 1-(3',4'-diethoxy benzyl)-2-(N-methyl-N-3'',4''-dimethoxy phenyl ethyl-$\beta$-amino ethyl)-6,7-diethoxy-1,2,3,4-tetrahydroisoquinoline, on subcutaneous administration to white mice, is about 330 mg. per kg. and, on intravenous administration, about 20 mg. per kg.

Said compound exhibits on the isolated intestines strong spasmolytic activity against spasms caused by barium chloride. Its points of attack are mainly of musculotropic nature. Its vasolytic activity can quite distinctly be demonstrated on decapitated animals by causing contraction of their circulatory system by continuous infusion of hypophysin or of adrenaline.

The highly effective new compound of Example 14, the 1 - (3',4' - diethoxy benzyl) - 2 - (N - methyl - N - 3'', 4''-dimethoxy phenyl ethyl-$\beta$-amino ethyl)-6,7-diethoxy-1,2,3,4-tetrahydroisoquinoline is used clinically, preferably in the form of its di-hydrochloride in doses from 25 mg. to 100 mg. depending on the route of administration. The preferred single dosage for adults is 50 mg. and the maximum daily dosage 200 mg. when administered orally or subcutaneously and 100 mg. when administered intravenously.

The new compounds according to the present invention are therapeutically employed in peripheral, pulmonary, or mesenteric arterial embolism and especially in relaxing spasms of peripheral or coronary blood vessels. They are also used in cases of threatened gangrene and of hypertension.

Said compounds according to the present invention are preferably orally administered in the form of tablets, pills, powders, capsules, solutions, emulsions, suspensions, dispersions, or in any other suitable form. They are preferably not used as such but are diluted with suitable diluting agents, thus, allowing better and more economical use to be made thereof.

In the case of powders, intimate and uniform dispersion of the active compound throughout the diluting agent is of importance. Such a fine dispersion can be achieved, for instance, by mixing and milling the new compounds with a solid, pulverulent extending agent to the desired degree of fineness or by impregnating the already milled, finely powdered, solid carrier with a solution of the active compound in water or a water miscible solvent and then removing the water or solvent.

As solid carriers which are suitable for the manufacture of pulverulent preparations, various inert pulverulent distributing agents may be employed.

When preparing tablets, pills, powders and the like, the commonly used diluting agents, binders, and the like are employed, such as sugar, lactose, talcum, starch, pectine, and as binders; gelatin, gum arabic, methyl cellulose, yeast extract, agar, tragacanth and others.

Especially advantageous therapeutic effects of the compounds according to the present invention and particularly of the compound of Example 14, the 1-(3',4'-diethoxy benzyl)-2-(N-methyl-N-3'',4''-dimethoxy phenyl ethyl-β-amino ethyl)-6,7-diethoxy-1,2,3,4-tetrahydroisoquinoline, are achieved by combination with theophylline derivatives and more particularly with theophylline derivatives corresponding to the formula

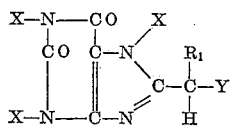

wherein $R_1$ indicates a member selected from the group consisting of hydrogen and an alkyl radical having not more than two carbon atoms, X indicates a member selected from the group consisting of hydrogen and methyl radicals, not more than two of said X being methyl radicals, and Y is a nitrogen containing group selected from the group consisting of the secondary amino group —NHR, the tertiary amino group —NRR', and the quaternary ammonium group —NRR'R''(Z) wherein R, R', and R'' are members selected from the group consisting of a saturated and an unsaturated alkyl radical having at least two carbon atoms, an alkanol radical, a phenyl radical, a phenyl alkyl radical, and a cyclohexyl radical, R and R', together with the nitrogen atom, a morpholino radical, and R, R', and R'', together with the nitrogen atom, a pyridinium radical, while Z is an anionic radical.

For instance, the combination of 1-(3',4'-diethoxy benzyl)-2-(N-methyl-N-3'',4''-dimethoxy phenyl ethyl-β-amino ethyl)-6,7-diethoxy-1,2,3,4-tetrahydroisoquinoline with 8-di-n-butylamino methyl theophylline has proved to be especially advantageous. Such a combination preparation is distinguished by its considerably prolonged decreasing effect upon peripheral total resistance and elastic resistance of blood vessels resulting in a long lasting lowering of the blood pressure. An increase in pulse frequency which is a characteristic property of theophylline compounds and which apparently causes a number of their undesired side-effects is substantially avoided by said combination. Output of the heart and minute volume are not reduced by said combination so that a considerable and sufficient amount of blood is offered to the dilated peripheral blood vessels although the frequency of the heart beat is not increased. No toxicity increase is observed when combining said two compounds.

In artificially induced hypertension said combination has proved to be far superior to papaverine on account of its long lasting lowering effect upon the blood pressure. Papaverine, under the same experimental conditions and given in dosages of equal effectiveness, produces initially an increase in the circulation volume and output of the heart which increase is followed by a decrease in circulation volume, output, and minute volume. Furthermore, administration of papaverine, ordinarily, results in strong regulatory counteractions which cause undesirable variations in the circulatory system. Therefore, a combination of papaverine with theophylline compounds, ordinarily, causes an undesired increase in the frequency of the heart beat and, consequently, increased subjective side-effects.

The new combination of 1-(3',4'-diethoxy benzyl)-2-(N-methyl-N-3'',4''-dimethoxy phenyl ethyl-β-amino ethyl)-6,7-diethoxy-1,2,3,4-tetrahydroisoquinoline and 8-di-n-butylamino methyl theophylline is also preferably orally administered in the form of tablets and the like as set forth hereinbefore.

Tablets, for instance, are composed as follows:

| | Mg. |
|---|---|
| 8-di-n-butylamino methyl theophylline | 100 |
| 1-(3',4'-diethoxy benzyl)-2-(N-methyl-N-3'',4''-dimethoxy phenyl ethyl-β-amino ethyl)-6,7-diethoxy-1,2,3,4-tetrahydroisoquinoline | 50 |
| Starch | 150 |
| Lactose | 50 |
| Talcum | 50 |
| Each tablet amounting to | 400 |

It is, of course, understood that the contents of active ingredients in such preparations may vary. Advantageously the active ingredients are present in said preparations in such amounts that a suitable dosage will be ensured. The unit dose should ordinarily contain not less than about 0.1% of the active ingredients. The preferred amount to be employed in tablets and like shaped solid preparations or in powders are between about 10% and about 40% of weight per unit dosage. To use greater amounts is, of course, also possible although, then, administration of suitable small dosages becomes somewhat cumbersome.

The total daily dose in the treatment of spastic conditions of the blood vessels and especially of the coronary arteries is between about 75 mg. and about 300 mg. of 1-(3'4'-diethoxy benzyl)-2-(N-methyl-N-3'',4''-dimethoxy phenyl ethyl-β-amino ethyl)-6,7-diethoxy-1,2,3,4-tetrahydroisoquinoline, and between about 150 mg. and about 600 mg. of 8-di-n-butylamino methyl theophylline, given orally three times daily in equally subdivided doses. In cases of hypertension the daily dose is about the same and is reduced according to the beneficial results achieved. A maintenance daily dose between about 150 mg. and about 200 mg. of the 1-benzyl tetrahydroisoquinoline compound and about 300 mg. and about 400 mg. of the theophylline compound has proved to yield very satisfactory results.

It is, of course, also possible to produce the quaternary ammonium compounds of the claimed new basically substituted 1-benzyl-1,2,3,4-tetrahydroisoquinoline compounds by reacting the same with quaternizing agents such as alkyl halogenides and especially methyl and ethyl bromides and iodides, dimethyl and diethyl sulfates, p-toluene sulfonic acid esters, benzyl bromide and iodide, and others.

Of course, many changes and variations in the process of making the new compounds, the reaction conditions, temperature and duration, in the solvents used, in the methods of working up the reaction mixture and of isolating and purifying the reaction products, in the form of the preparations used in therapy and their composition, in the theophylline compounds employed in combination with the new 1-benzyl tetrahydroisoquinoline compounds, and the like may be made by those skilled in the art in accordance with the principles set forth herein and in the claims annexed hereto.

I claim:

1. 1-(3',4'-diethoxy benzyl)-2-(N-methyl-N-3'',4''-dimethoxy phenyl ethyl-β-amino ethyl)-6,7-diethoxy-1,2,3,4-tetrahydroisoquinoline of the formula

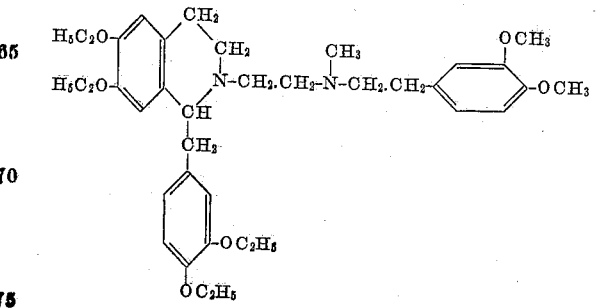

2. The di-hydrochloride of 1-(3',4'-diethoxy benzyl)-2-(N-methyl-N-3",4"-dimethoxy phenyl ethyl-β-amino ethyl)-6,7-diethoxy-1,2,3,4-tetrahydroisoquinoline.

3. A 1-benzyl tetrahydroisoquinoline compound selected from the group consisting of a 1-benzyl-1,2,3,4-tetrahydroisoquinoline compound of the formula

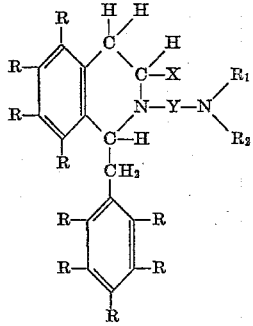

wherein

X indicates a member selected from the group consisting of hydrogen and a lower alkyl radical, R indicates a member selected from the group consisting of hydrogen, the methoxy group, and the ethoxy group, Y indicates a lower alkylene radical having 2 to 4 carbon atoms, and R₁ and R₂ indicate members selected from the group consisting of hydrogen, a lower alkyl radical, an aralkyl radical with 7 to 8 carbon atoms, an aralkyl radical with 7 to 8 carbon atoms and having lower alkoxy groups attached to the aryl ring, and R₁ and R₂ forming together with the nitrogen atom to which they are attached, a monocyclic heterocyclic ring, and the acid addition salts of said compounds with acids tolerated by the human body and not substantially affecting the physiological activity of said 1-benzyl tetrahydroisoquinoline compound.

4. In a process of producing 1-benzyl-1,2,3,4-tetrahydroisoquinoline compounds of the formula

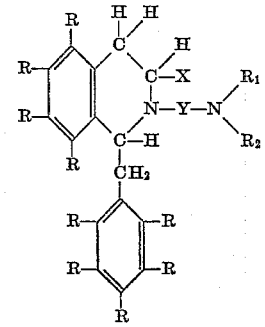

wherein

X indicates a member selected from the group consisting of hydrogen and a lower alkyl radical, R indicates a member selected from the group consisting of hydrogen, the methoxy group, and the ethoxy group, Y indicates a lower alkylene radical having 2 to 4 carbon atoms, and R₁ and R₂ indicate members selected from the group consisting of hydrogen, a lower alkyl radical, an aralkyl with 7 to 8 carbon atoms, an aralkyl radical with 7 to 8 carbon atoms and having lower alkoxy groups attached to the aryl ring, and R₁ and R₂ forming together with the nitrogen atom to which they are attached, a monocyclic heterocyclic ring, the step comprising condensing a 1-benzyl-1,2,3,4-tetrahydroisoquinoline compound of the formula

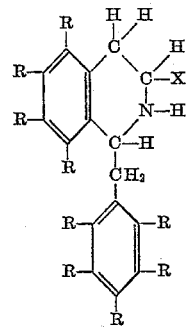

wherein X and R are the same members as indicated above, with a halogeno compound of the formula

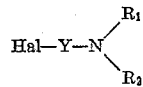

wherein Hal indicates halogen and Y, R₁, and R₂ are the same members as indicated above, by heating a mixture of said compounds until hydrogen halide is split off and the 1-benzyl-1,2,3,4-tetrahydroisoquinoline compound of the above given formula is obtained.

5. In a process of producing 1-benzyl-1,2,3,4-tetrahydroisoquinoline compounds according to claim 4, wherein condensation is effected with the addition of a hydrogen halide binding agent.

6. In a process of producing 1-benzyl-1,2,3,4-tetrahydroisoquinoline compounds according to claim 5, wherein condensation is effected under anhydrous condition with the addition of an organic solvent and a substantially anhydrous alkali carbonate.

7. In a process of producing 1-benzyl-1,2,3,4-tetrahydroisoquinoline compounds of the formula

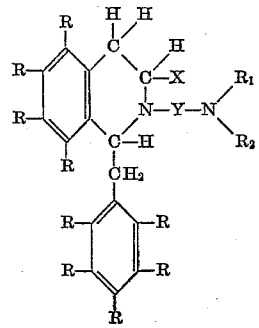

wherein

X indicates a member selected from the group consisting of hydrogen and a lower alkyl radical, R indicates a member selected from the group consisting of hydrogen, the methoxy group, and the ethoxy group, Y indicates a lower alkylene radical having 2 to 4 carbon atoms, and R₁ and R₂ indicate members selected from the group consisting of hydrogen, a lower alkyl radical, an aralkyl radical with 7 to 8 carbon atoms, an aralkyl radical with 7 to 8 carbon atoms and having lower alkoxy groups attached to the aryl ring, and R₁ and R₂ forming together with the nitrogen atom to which they are attached, a monocyclic heterocyclic ring, the steps comprising condensing a 1-benzyl-1,2,3,4-tetrahydroisoquinoline compound of the formula

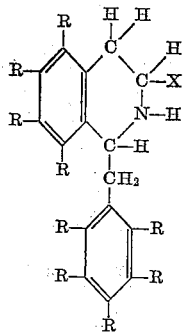

wherein X and R are the same members as indicated above, with a compound selected from the group consisting of an alkylene oxide and a halogeno alcohol, by heating a mixture of said reaction components until the corresponding alcohol is formed, exchanging the hydroxyl group in said alcohol by halogen, and substituting said halogen atom by an amino group by reacting the resulting 1-benzyl-2-halogeno alkyl-1,2,3,4-tetrahydroisoquinoline compound with a compound selected from the group consisting of ammonia and an amine.

8. In a process of producing 1-benzyl-1,2,3,4-tetrahydroisoquinoline compounds of the formula

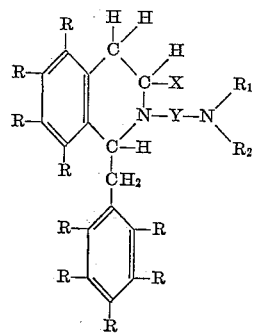

wherein

X indicates a member selected from the group consisting of hydrogen and a lower alkyl radical,
R indicates a member selected from the group consisting of hydrogen, the methoxy group, and the ethoxy group,
Y indicates a lower alkylene radical having 2 to 4 carbon atoms, and
$R_1$ and $R_2$ indicate members selected from the group consisting of hydrogen, a lower alkyl radical, an aralkyl radical with 7 to 8 carbon atoms, an aralkyl radical with 7 to 8 carbon atoms and having lower alkoxy groups attached to the aryl ring, and $R_1$ and $R_2$ forming together with the nitrogen atom to which they are attached, a monocyclic heterocyclic ring, the step comprising reacting a 1-benzyl-1,2,3,4-tetrahydroisoquinoline compound of the formula

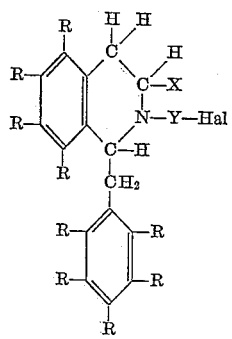

wherein Hal is halogen and R, X, and Y are the same members as indicated above, with a compound selected from the group consisting of ammonia and an amine, thereby exchanging the halogen atom by an amino group.

9. In a process of producing 1-benzyl-1,2,3,4-tetrahydroisoquinoline compounds of the formula

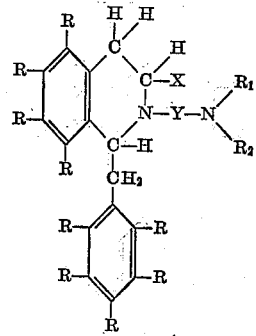

wherein

X indicates a member selected from the group consisting of hydrogen and a lower alkyl radical,
R indicates a member selected from the group consisting of hydrogen, the methoxy group, and the ethoxy group,
Y indicates a lower alkylene radical having 2 to 4 carbon atoms, and
$R_1$ and $R_2$ indicate members selected from the group consisting of hydrogen, a lower alkyl radical, an aralkyl radical with 7 to 8 carbon atoms, an aralkyl radical with 7 to 8 carbon atoms and having lower alkoxy groups attached to the aryl ring, and $R_1$ and $R_2$ forming together with the nitrogen atom to which they are attached, a monocyclic heterocyclic ring, the steps comprising adding a halogeno alcohol to a 1-benzylisoquinoline compound selected from the group consisting of a 1-benzylisoquinoline compound of the formula

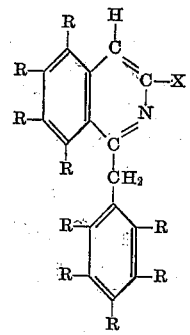

and a 1-benzyl-3,4-dihydroisoquinoline compound of the formula

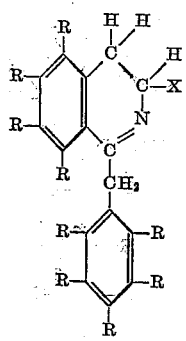

wherein R and X are the same members as indicated above, to form the corresponding quaternary ammonium compound having an alcoholic hydroxyl group, hydrogenating the double bonds in the heterocyclic ring of said 1-benzyl isoquinoline compound, exchanging the hydroxyl group by halogen, and substituting said halogen atom by an amino group by reacting the resulting 1- benzyl-2-halogeno alkyl-1,2,3,4-tetrahydroisoquinoline compound with a compound selected from the group consisting of ammonia and an amine.

10. In a process of producing 1-benzyl-1,2,3,4-tetrahydroisoquinoline compounds of the formula

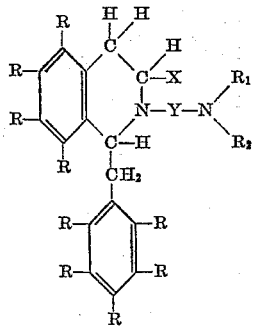

wherein

X indicates a member selected from the group consisting of hydrogen and a lower alkyl radical, R indicates a member selected from the group consisting of hydrogen, the methoxy group, and the ethoxy group, Y indicates a lower alkylene radical having 2 to 4 carbon atoms, and $R_1$ and $R_2$ indicate members selected from the group consisting of hydrogen, a lower alkyl radical, an aralkyl radical with 7 to 8 carbon atoms, an aralkyl radical with 7 to 8 carbon atoms and having lower alkoxy groups attached to the aryl ring, and $R_1$ and $R_2$ forming together with the nitrogen atom to which they are attached, a monocyclic heterocyclic ring, the steps comprising adding a halogeno alcohol to a 1-benzyl isoquinoline compound selected from the group consisting of a 1-benzyl isoquinoline compound of the formula

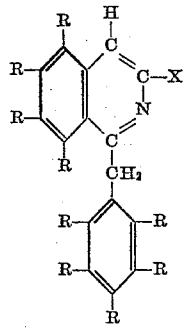

and a 1-benzyl-3,4-dihydroisoquinoline compound of the formula

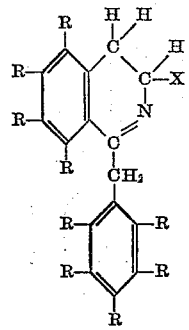

wherein R and X are the same members as indicated above, to form the corresponding quaternary ammonium compound having an alcoholic hydroxyl group, exchanging the hydroxyl group in said quaternary ammonium compound by halogen, substituting said halogen atom by an amino group by reacting the resulting halogen compound with a compound selected from the group consisting of ammonia and an amine, and hydrogenating the double bonds in the heterocyclic ring of said 1-benzyl isoquinoline compound.

11. In a process of producing 1-(3',4'-diethoxy benzyl)-2-(N-methyl-N-3'',4''-dimethoxy phenyl ethyl-β-amino ethyl)-6,7-diethoxy-1,2,3,4-tetrahydroisoquinoline, the steps comprising dissolving N-(3,4-dimethoxy phenyl-β-ethyl)-N-methylamino-β-chloro ethane in acetone, adding to said solution 1-(3',4'-diethoxy benzyl)-6,7-diethoxy-1,2,3,4-tetrahydroisoquinoline and anhydrous potassium carbonate, heating the mixture under reflux under substantially anhydrous conditions to effect condensation of the reaction components, removing by filtration the potassium salt, evaporating the solvent, dissolving the resulting crude base in a mixture of equal parts of ethanol and ether, introducing gaseous hydrochloric acid into said solution until acidified, and separating the resulting precipitated di-hydrochloride of 1-(3',4'-diethoxy benzyl)-2-(N-methyl-N-3'',4''-dimethoxy phenyl ethyl-β-amino ethyl)-6,7-diethoxy-1,2,3,4-tetrahydroisoquinoline from the solution.

12. An antispasmodic preparation comprising, as active ingredient, a 1-benzyl tetrahydroisoquinoline compound selected from the group consisting of a 1-benzyl-1,2,3,4-tetrahydroisoquinoline compound of the formula

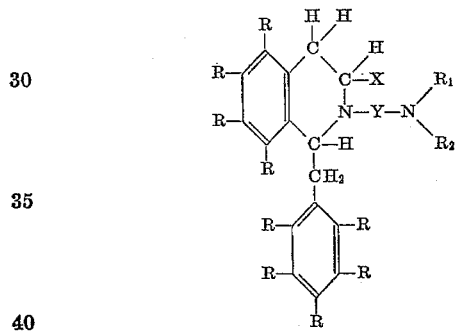

wherein

X indicates a member selected from the group consisting of hydrogen and a lower alkyl radical, R indicates a member selected from the group consisting of hydrogen, the methoxy group, and the ethoxy group, Y indicates an alkylene radical having 2 to 4 carbon atoms, and $R_1$ and $R_2$ indicate members selected from the group consisting of hydrogen, a lower alkyl radical, an aralkyl radical with 7 to 8 carbon atoms, an aralkyl radical within 7 to 8 carbon atoms and having lower alkoxy groups attached to the aryl ring, and $R_1$ and $R_2$ forming together with the nitrogen atom to which they are attached, a monocyclic heterocyclic ring, and its acid addition salts with acids tolerated by the human body and not substantially affecting the physiological activity of said 1-benzyl tetrahydroisoquinoline compound, and a theophylline compound selected from a group consisting of a theophylline compound of the formula

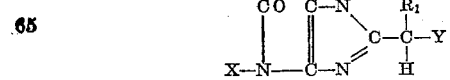

wherein $R_1$ indicates a member selected from the group consisting of hydrogen and an alkyl radical having not more than two carbon atoms, X indicates a member selected from the group consisting of hydrogen and methyl radicals, not more than two of said X being methyl radicals, and Y is a nitrogen containing group selected from the group consisting of the secondary amino group —NHR, the tertiary amino group —NRR', and the quaternary ammonium group —NRR′R″(Z) wherein R, R′, and R″ are members selected from the group consisting of a saturated and an unsaturated alkyl radical having at least two carbon atoms, an alkanol radical, a phenyl radical, a phenyl alkyl radical, and a cyclohexyl radical, R and R′, together with the nitrogen atom, a morpholino radical, and R, R′, and R″, together with the nitrogen atom, a pyridinium radical, while Z is an anionic radical, and its acid addition salts with a non-toxic acid.

13. An antispasmodic preparation, comprising, as active ingredients, 1 - (3′,4′ - diethoxy benzyl)-2-(N-methyl-N-3″,4″-dimethoxy phenyl ethyl-β-amino ethyl)-6,7-diethoxy-1,2,3,4-tetrahydroisoquinoline and 8-di-n-butylamino methyl theophylline.

14. An antispasmodic preparation, comprising, as active ingredients, the di-hydrochloride of 1-(3′,4′-diethoxy benzyl)-2-(N-methyl-N-3″,4″-dimethoxy phenyl ethyl-β-amino ethyl) - 6,7-diethoxy-1,2,3,4-tetrahydroisoquinoline and the hydrochloride of 8-di-n-butylamino methyl theophylline.

References Cited in the file of this patent

UNITED STATES PATENTS

| | | |
|---|---|---|
| 955,587 | Englemann | Apr. 19, 1910 |
| 2,662,083 | Eastland et al. | Dec. 8, 1953 |

OTHER REFERENCES

Gehes Codex, 8th Ed., 1953, Stuttgart Wissenschaftliche Verlag., pp. 628, 823.

Holliman et al.: J. Chem. Soc., 1945, pp. 34–37.